(12) United States Patent
Maricic et al.

(10) Patent No.: US 10,704,656 B2
(45) Date of Patent: Jul. 7, 2020

(54) ANNULAR TENSIONER HAVING IDENTICAL BEARING PARTS FOR THE ANNULAR LEVER

(71) Applicant: Schaeffler Technologies AG & Co. KG, Herzogenaurach (DE)

(72) Inventors: Zoran Maricic, Furth (DE); Alexander Weidner, Furth (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 335 days.

(21) Appl. No.: 15/575,091

(22) PCT Filed: Jul. 26, 2016

(86) PCT No.: PCT/DE2016/200343
§ 371 (c)(1),
(2) Date: Nov. 17, 2017

(87) PCT Pub. No.: WO2017/025089
PCT Pub. Date: Feb. 16, 2017

(65) Prior Publication Data
US 2018/0156317 A1      Jun. 7, 2018

(30) Foreign Application Priority Data
Aug. 13, 2015   (DE) .................. 10 2015 215 421

(51) Int. Cl.
*F16H 7/12*          (2006.01)
*F16H 7/08*          (2006.01)

(52) U.S. Cl.
CPC ......... *F16H 7/1281* (2013.01); *F16H 7/0831* (2013.01); *F16H 7/1218* (2013.01);
(Continued)

(58) Field of Classification Search
CPC .... F16H 7/1281; F16H 7/0831; F16H 7/1218; F16H 2007/0806; F16H 2007/0808; F16H 2007/0865; F16H 2007/0893
See application file for complete search history.

(56) References Cited

U.S. PATENT DOCUMENTS 6,648,783 B1 * 11/2003 Bogner ................ F16H 7/1281
474/134
8,968,128 B2   3/2015  Wolf et al.
(Continued)

FOREIGN PATENT DOCUMENTS

CN      103062346      4/2013
CN      103987940      8/2014
(Continued)

*Primary Examiner* — Michael R Mansen
*Assistant Examiner* — Robert T Reese
(74) *Attorney, Agent, or Firm* — Volpe and Koenig, P.C.

(57) ABSTRACT

The invention relates to a belt or chain tensioner (1) for a belt or chain drive of an internal combustion engine, having a base unit (2), an annular tensioning arm (3) which is mounted so as to be rotatable relative to the base unit (2) about an axis of rotation and on which a tensioning roll (4) prepared for pre-tensioning a section of an endless belt or chain is arranged, and two interconnected bearing parts (5, 6), by which the tensioning arm (3) is pivotally mounted on the base unit (2), and the bearing parts (5, 6) are designed as identical parts.

10 Claims, 10 Drawing Sheets

(52) U.S. Cl.
CPC .............. *F16H 2007/0806* (2013.01); *F16H 2007/0808* (2013.01); *F16H 2007/0865* (2013.01); *F16H 2007/0893* (2013.01)

(56) References Cited

U.S. PATENT DOCUMENTS

| | | |
|---|---|---|
| 9,097,314 B2 | 8/2015 | Wolf et al. |
| 9,103,411 B2 | 8/2015 | Wolf et al. |
| 9,416,853 B2 | 8/2016 | Wolf et al. |
| 9,523,415 B2 | 12/2016 | Schauerte et al. |
| 2009/0298631 A1 | 12/2009 | Jud et al. |
| 2013/0203535 A1 | 8/2013 | Mack et al. |
| 2019/0203811 A1* | 7/2019 | Maricic .................... F16H 7/08 |

FOREIGN PATENT DOCUMENTS

| | | |
|---|---|---|
| CN | 104033552 | 9/2014 |
| DE | 102011082764 | 4/2012 |
| DE | 102011053869 | 3/2013 |
| DE | 102012209028 | 12/2013 |
| DE | 102012210557 | 12/2013 |
| EP | 2128489 | 12/2009 |
| EP | 2557295 | 2/2013 |

\* cited by examiner

ANNULAR TENSIONER HAVING IDENTICAL BEARING PARTS FOR THE ANNULAR LEVER

BACKGROUND

The invention relates to a traction mechanism tensioner that is also designated as an annular tensioner for a traction mechanism drive, such as a chain or belt drive of an internal combustion engine, preferably a diesel or gasoline engine of a motor vehicle, such as a passenger car, truck, bus, or agricultural commercial vehicle, with a base unit, an annular tensioning arm that is supported so that it can rotate about a rotational axis relative to the base unit, wherein a tensioning roller provided for pretensioning a section of an endless traction mechanism is arranged on the tensioning arm, and also with two bearing components that are connected to each other and by which bearing components the tensioning arm is supported on the base unit so that they can rotate.

Traction mechanism tensioners according to the class are already known from the prior art. Here, e.g., DE 10 2012 210 557 A1 discloses a belt tensioning device for a belt drive, in particular, for an auxiliary unit belt drive of an internal combustion engine/combustion engine. The belt drive has a driven belt pulley that is connected to an auxiliary unit so that it can rotate about a rotational axis, at least one drive belt pulley, and a belt. With the belt, the driven belt pulley can be driven. The belt tensioning device has a tensioning roller and a tensioner housing and is connected mechanically to a housing of the auxiliary unit by the tensioner housing. Torque is transferred only in one rotational direction of the belt pulley.

Prior art is also known from DE 10 2011 053 869 A1 that likewise discloses a belt tensioning device for a belt drive, wherein the belt drive has at least one unit with a housing, a drive shaft, and a belt pulley, as well as an endless belt for driving the belt pulley.

Various traction mechanism tensioners are already known that have a tensioning arm that is, in turn, always supported so that it can rotate relative to a base component/base unit. However, it has proven disadvantageous in these constructions that components with relatively complex designs frequently have to be used, which form, for example, the tensioning arm and its support. There is also often a relatively large number of components in order for the traction mechanism tensioner to have the longest possible service life, which, however, also increases the manufacturing expense of the traction mechanism tensioner.

SUMMARY

Therefore, the objective of the present invention is to eliminate these disadvantages known from the prior art and, in particular, to provide a traction mechanism tensioner whose design is simplified, and production costs are further reduced.

This is achieved according to the invention in that the bearing components that are used for supporting the tensioning arm are constructed as identical parts, i.e., as parts that are produced with identical materials and identical geometrical/structural designs.

The bearing components that are now constructed as identical parts therefore cannot only be produced in high quantities in an especially economical way, but can also be used in different structural designs of the traction mechanism tensioner. Therefore, it is possible to produce the traction mechanism tensioner in an especially economical way.

Additional advantageous embodiments are explained in more detail below.

If the bearing components are made from a plastic material, their production is further simplified.

In this context, it is also advantageous if the tensioning arm is made from a lightweight metal material, for example, an aluminum material. Therefore, the tensioning arm is especially lightweight and also has a long service life.

If each bearing component has a disk-shaped base section, the support of the tensioning arm can be arranged on the tensioning arm in a way that is especially space-saving.

In this context, it is also preferable if the base section of the respective bearing component contacts or is connected to the tensioning arm with an axial end side (rotationally locked, preferably by a friction-fit connection) facing the tensioning arm. Furthermore, preferably the base section of the respective bearing component contacts an annular/disk-shaped base body of the tensioning arm with the axial end side facing the tensioning arm. In this way, an even more compact construction and arrangement of the bearing components is implemented.

Furthermore, it is also advantageous if the base section of the respective bearing component is constructed with a (second) axial end side facing away from the tensioning arm as a sliding bearing surface that is held on or in the base unit so that it can rotate relative to the base unit. In this way, the two bearing components form a sliding bearing of the tensioning arm also in a space-saving manner.

In addition, if a first bearing component is arranged with its base section on a first axial side of the tensioning arm and a second bearing component is arranged with its base section on a second axial side of the tensioning arm facing away from the first axial side, the bearing components are attached in an especially space-saving manner.

If each bearing component forms an inner collar area that runs in the axial direction and supports the tensioning arm in the radial direction (relative to the base component) on the inside, an inner support of the tensioning arm relative to the bearing components is also implemented in a space-saving manner.

It is further advantageous if the inner collar area forms a friction-locking contact on the tensioning arm (i.e., rotationally locked by a friction-fit connection).

It is also advantageous if each bearing component forms at least one outer collar area that runs in the axial direction and supports, in turn, the tensioning arm in the radial direction (relative to the base component) on the outside. Thus, the tensioning arm is even more effectively supported also on the outside relative to the bearing component.

Advantageously, the two bearing components are also connected to each other and/or to the tensioning arm (rotationally locked) by a positive-fit and/or non-positive-fit connection, because then the fastening of the bearing components is implemented in an especially compact manner.

In this context, it is also preferred if the two bearing components are connected to each other by at least one latch tab connection with the rotationally locked holding of the tensioning arm. Therefore, the fastening of the bearing components is further simplified.

It is also advantageous if the bearing components are arranged rotated relative to each other along the periphery with respect to the rotational axis of the tensioning arm, preferably rotated by 180° relative to each other. Therefore, the bearing components are arranged in an especially smart manner on the tensioning arm and can be fastened rigidly to the arm.

In other words, an annular lever support/support of the tensioning arm is realized that has, for cost optimization purposes, two bearing components that are constructed as identical parts, wherein these are always constructed as a friction lining for the annular lever support on the side of the tensioning arm.

BRIEF DESCRIPTION OF THE DRAWINGS

The invention will now be described in more detail below with reference to different figures. Shown are.

DETAILED DESCRIPTION

The figures are merely of a schematic nature and are used only for understanding the invention. Identical elements are provided with the same reference symbols.

Figure 1:
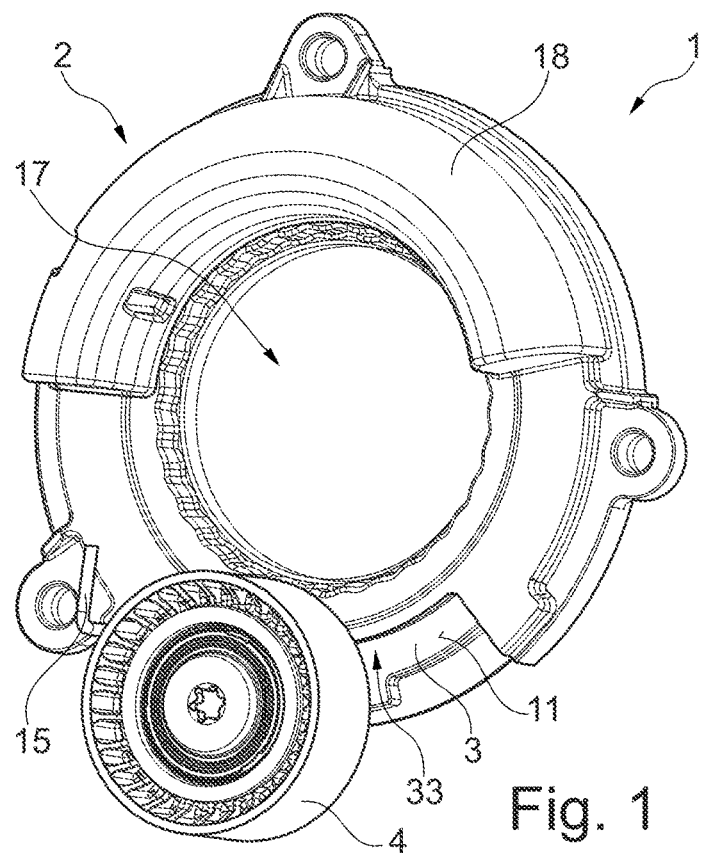
FIG. 1 a perspective view of a traction mechanism tensioner according to the invention according to a preferred embodiment from its front side, wherein, in the assembled state of the traction mechanism tensioner, a tensioning roller held on the tensioning arm can be seen, FIG. 2 a perspective view of the traction mechanism tensioner according to FIG. 1 from the front side, wherein the illustration of the tensioning roller is omitted and therefore the bearing of the tensioning roller on the tensioning arm and the rotating area of the tensioning arm can be seen through the cutout in the base unit, FIG. 3 a perspective view of a part assembly comprised of the tensioning arm, bearing components, a spring tensioning unit, and a cover of the base unit of the traction mechanism tensioner according to FIGS. 1 and 2, wherein it can be seen how a lever attached to the tensioning arm contacts the spring tensioning unit for the elastic pretensioning of the tensioning arm relative to the base unit during operation and a locking tool fixes the cover in its rotational position relative to the tensioning arm, FIG. 4 a perspective view of a part assembly comprised of tensioning arm, bearing components, and spring tensioning unit of the traction mechanism tensioner according to FIG. 1, FIG. 5 an exploded view of the traction mechanism tensioner according to FIG. 1 from its front side in which the individual components of the traction mechanism tensioner can be easily seen, FIG. 6 an exploded view of the traction mechanism tensioner according to FIG. 1, similar to the exploded view of FIG. 5, wherein the traction mechanism tensioner is now shown, from a rear side facing away from the front side shown, among other things, in FIGS. 1 and 5, wherein the arc-shaped receptacle for holding the spring unit can be easily seen, FIG. 7 a perspective view of the tensioning arm installed in the traction mechanism tensioner according to FIG. 1 from its front side, which is already connected to the two bearing components, FIG. 8 a perspective view of the tensioning arm, similar to FIG. 7, wherein the tensioning arm is shown again from a front side, but now the illustration of the first bearing component is eliminated, FIG. 9 a perspective view of the tensioning arm according to FIG. 7 including the bearing components, wherein the tensioning arm is now shown from its rear side on which the second bearing component is arranged, FIG. 10 an exploded view of the tensioning arm from the front side according to FIG. 7 including the bearing components in which the identical construction of the two bearing components can be seen in an especially easy manner, FIG. 11 an exploded view of the tensioning arm similar to FIG. 10 including the bearing components, wherein the tensioning arm is shown from its rear side, FIG. 12 an exploded view of the tensioning arm according to FIG. 7 including the bearing components in a side view, wherein the arrangement and construction of a snap-on tab of the first bearing component can be seen, which is provided to be connected to the tensioning arm and also to the second bearing component, FIG. 13 an exploded view again of the tensioning arm including the bearing components similar to FIG. 11, wherein now the arrangement and construction of a snap-on tab of the second bearing component can be seen, FIG. 14 a perspective view of the tensioning arm according to FIG. 7 including the bearing components, wherein the second bearing component contacts the tensioning arm, while the first bearing component is arranged at a distance from the tensioning arm, FIG. 15 a perspective view of the tensioning arm including the bearing components that are connected rigidly to each other and also to the tensioning arm, FIG. 16 a perspective view of the two bearing components, how they are used with the tensioning arm, as can be seen, e.g., in FIG. 7, FIG. 17 a perspective view of the first bearing component that is designed and constructed like the second bearing component and can be seen from an end side approximately facing the tensioning arm in FIG. 7, and FIG. 18 a perspective view of the two bearing components, wherein these are connected to each other with a positive-fit connection by their snap-on tab.
Figure 2:
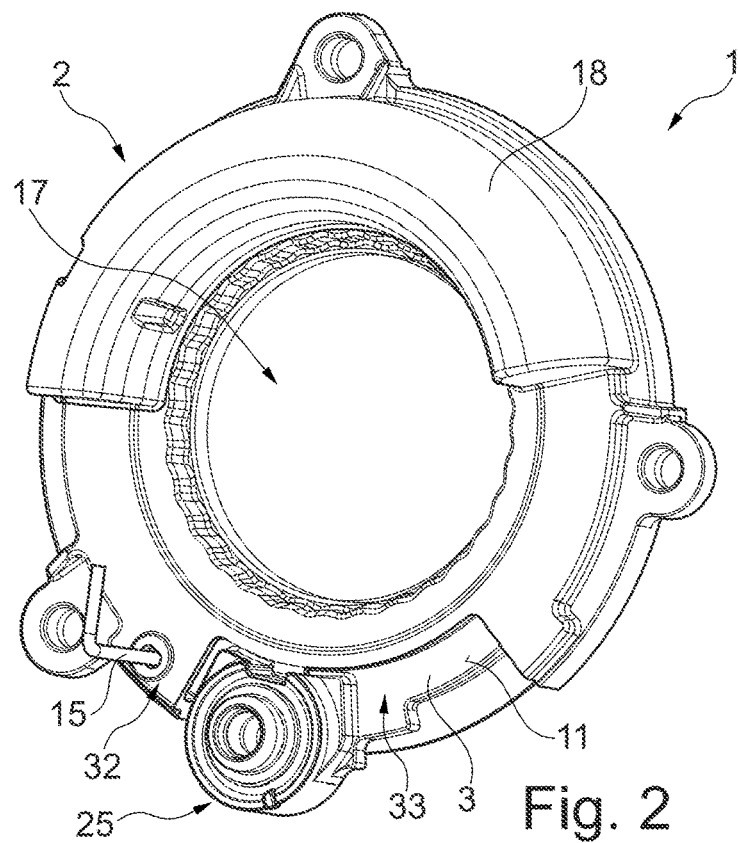
Figure 3:
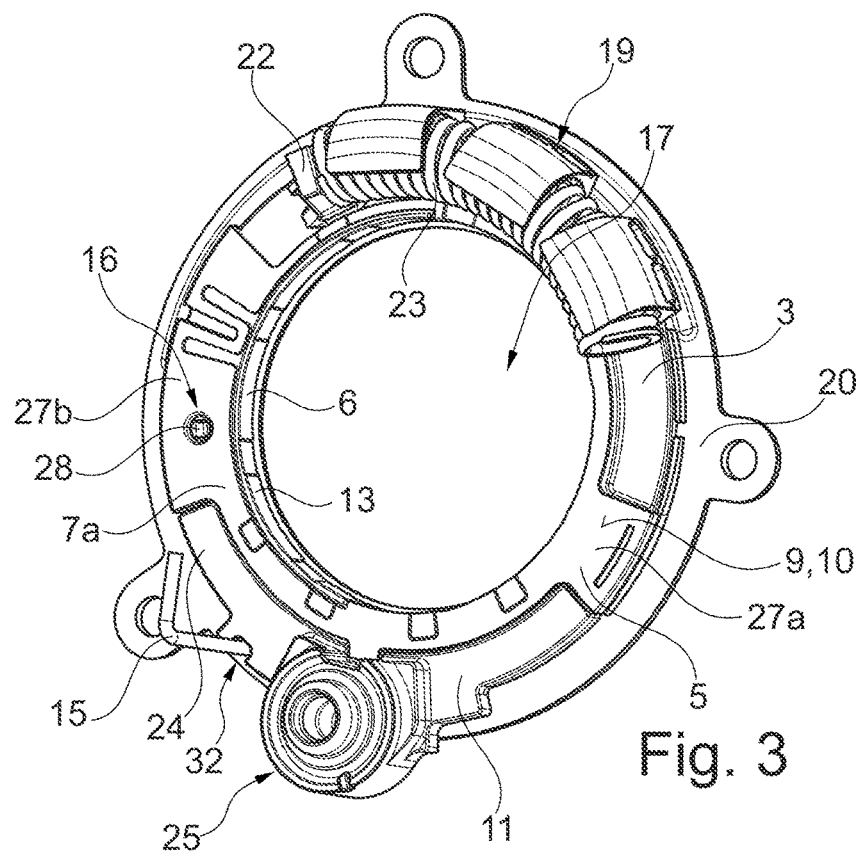

The traction mechanism tensioner 1 can be seen in its entirety especially well in FIGS. 1 to 3. The traction mechanism tensioner 1 is constructed as a belt tensioner, i.e., for pretensioning a belt drive of an internal combustion engine. As an alternative, according to another embodiment, it is constructed as a chain tensioner, wherein then it pretensions a chain drive of an internal combustion engine. In particular, it is a traction mechanism drive that connects an auxiliary unit to an output shaft of the internal combustion engine in a rotationally locked manner.

The traction mechanism tensioner 1 is further constructed as an annular tensioner and thus has an essentially annular shape. The traction mechanism tensioner 1 has a central through hole 17 with which it is pushed, e.g., over a housing of the auxiliary unit, preferably a generator housing, for operation and surrounds this housing in the radial direction. The traction mechanism tensioner 1 has, in addition to an annular base unit 2, also a similarly annular tensioning arm 3 that can be seen easily, e.g., in FIGS. 5 and 6, and a bearing unit.

The base unit 2 has a multiple-part construction. An annular base body 18 of the base unit 2 holds a spring tensioning unit 19, wherein the spring tensioning unit 19 is provided for pretensioning the tensioning arm 3 in the operating state relative to the base body 18. The base unit 2 also has a disk-shaped cover 20 that is similarly constructed as a ring and is connected locked in rotation with the base body 18 during operation of the traction mechanism tensioner 1. In an axial intermediate space between the base body 18 and the cover 20, during operation, the tensioning arm 3 including the bearing components 5 and 6 that are used for supporting this tensioning arm 3 relative to the base unit 2 is held. In FIG. 1, the traction mechanism tensioner 1 is already completely assembled, wherein the cover 20 is connected rigidly to the base body 18, as can be seen especially well in FIG. 3.

Figure 4:
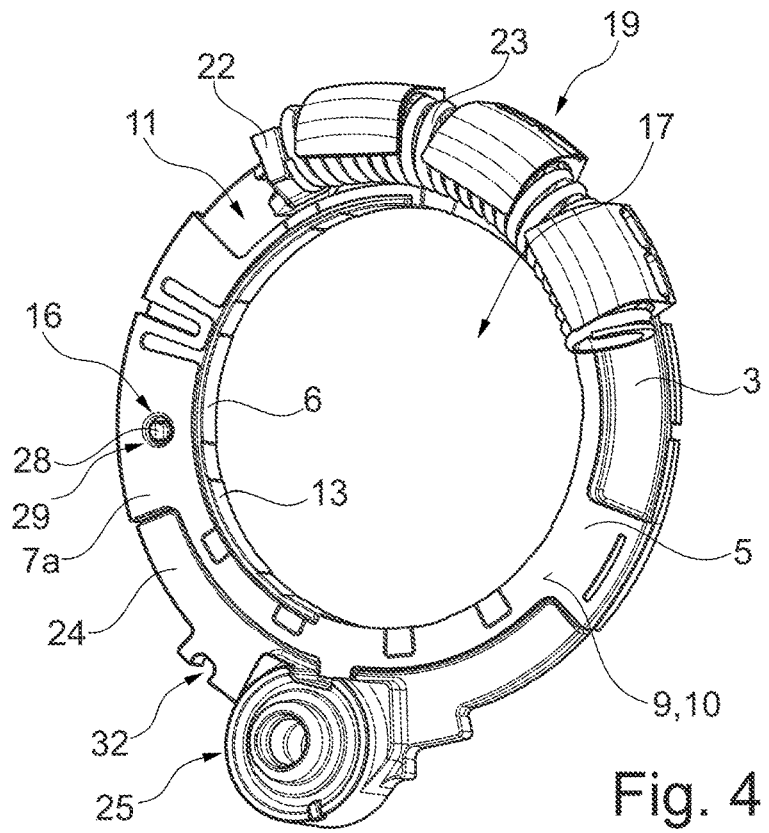
Figure 5:
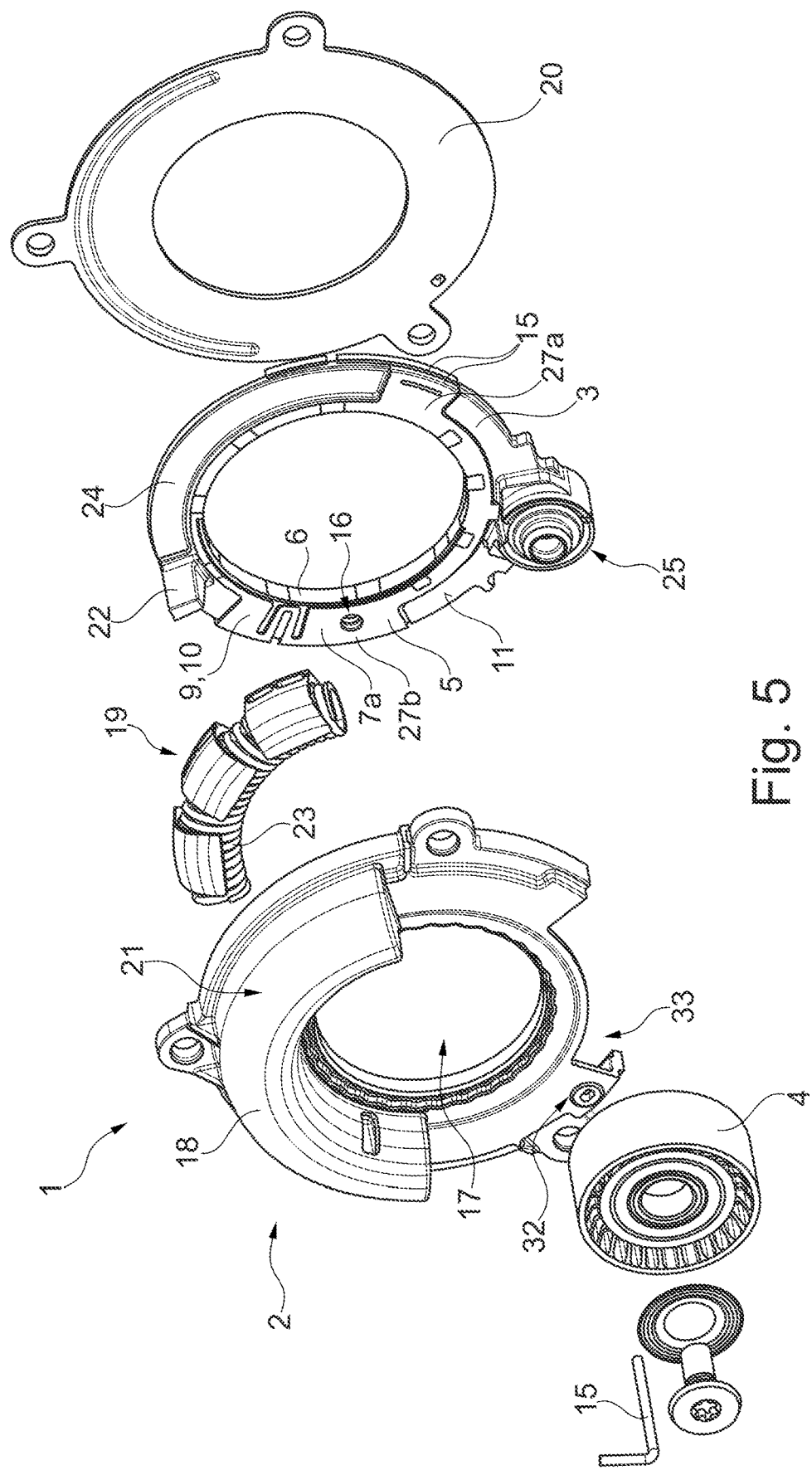
Figure 6:
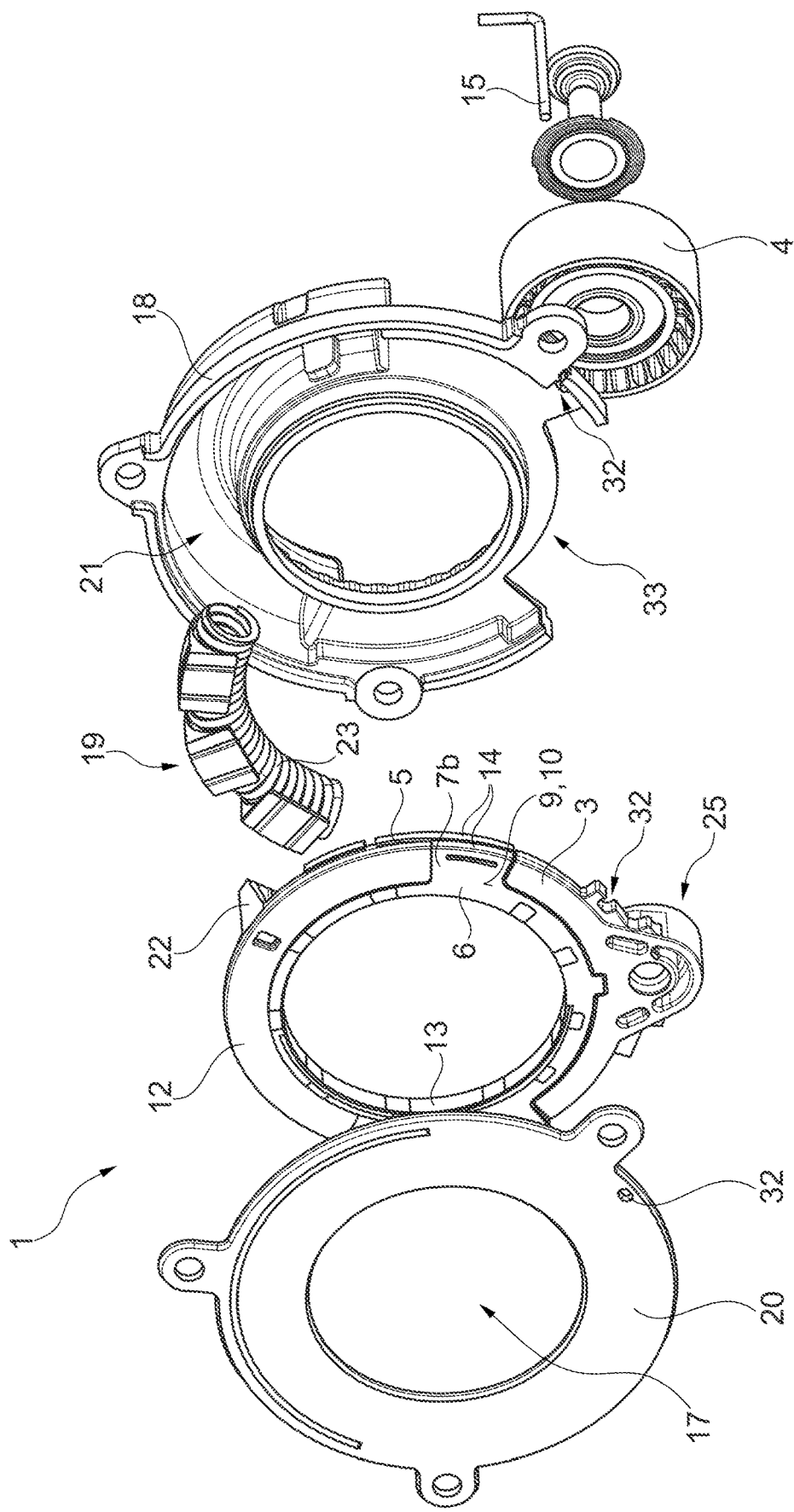

As can be seen in FIG. 3 in connection with FIGS. 4 and 5, in a hollow receptacle 21 that is constructed by the base body 18 and runs in an arc shape along a peripheral part area of the base body 18, the spring tensioning unit 19 is held. The tensioning arm 3 is here provided with a lever 22/support lever/spring driver that projects in the axial direction into this receptacle 21. The spring tensioning unit 19 is formed, in turn, by an arc-shaped spiral compression spring 23 (in other embodiments, also multiple spiral compression springs). The spiral compression spring 23 is supported, in turn, by three sliding blocks in its arc-shaped extent and guided in its spring path. The spiral compression spring 23 contacts the lever 22 with a first end area viewed in the peripheral direction, a support surface of the receptacle 21/base body 18 with a second area in the peripheral direction opposite this first end, as can also be easily seen in FIG. 6. In this way, the tensioning arm 3 is pretensioned by the spring tensioning unit 19 in a rotational direction relative to the base body 18/base unit 2.

Figure 10:
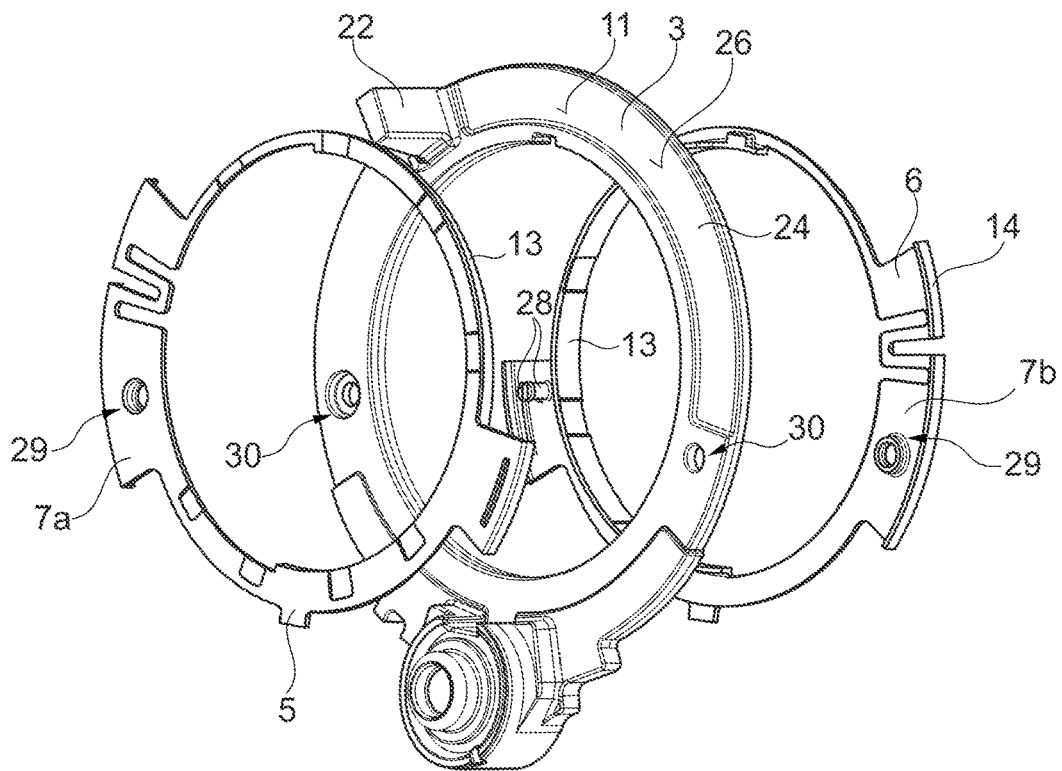
Figure 11:
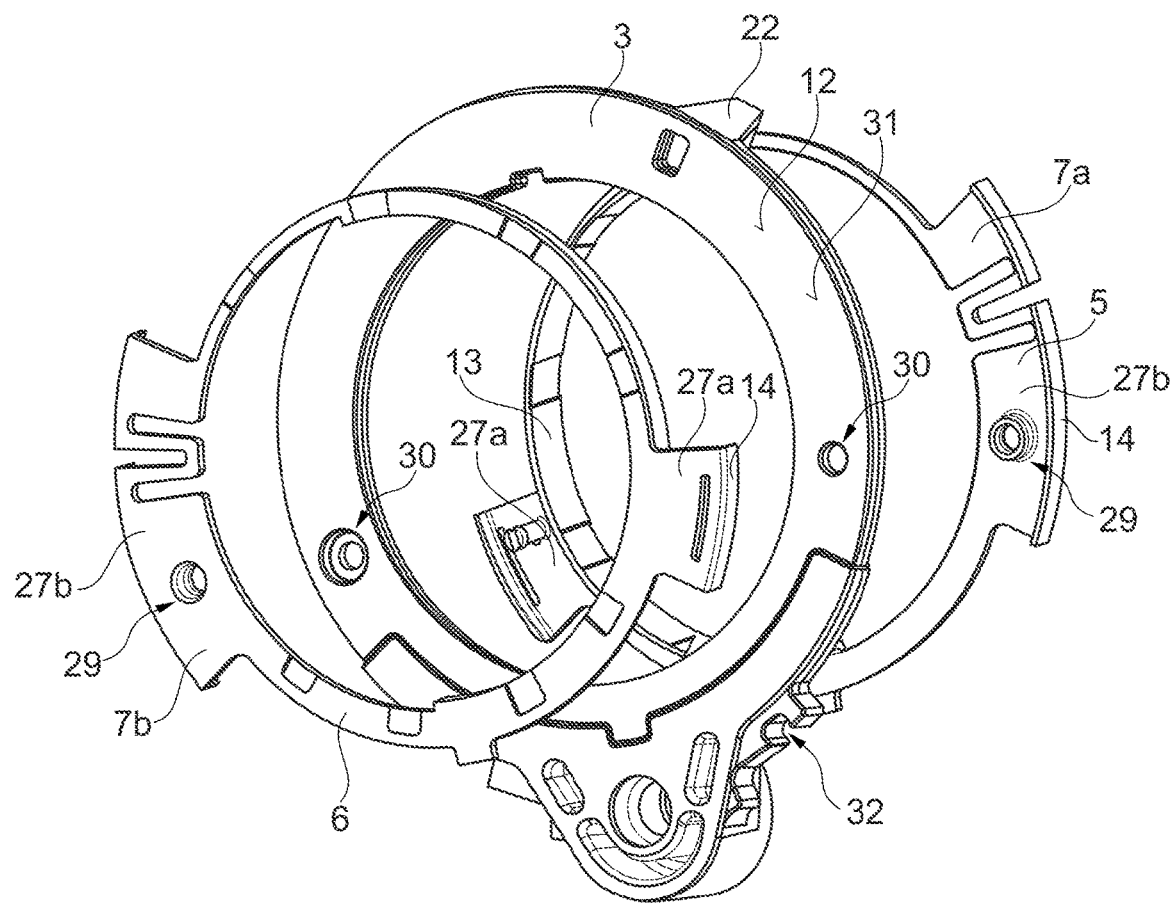
Figure 12:
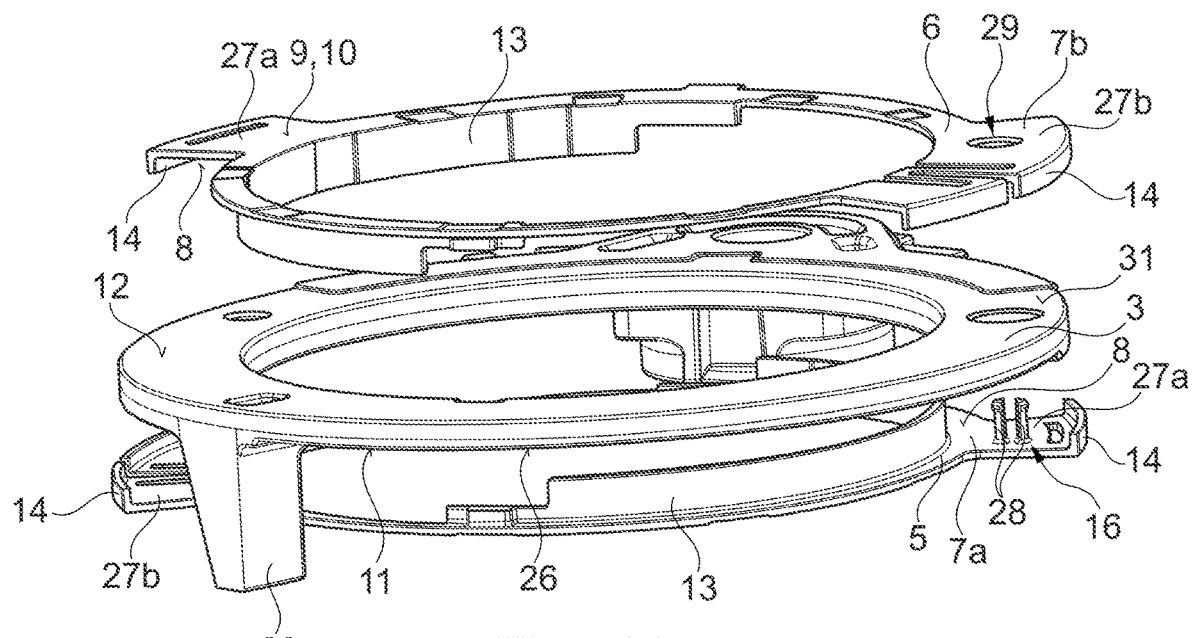
Figure 13:
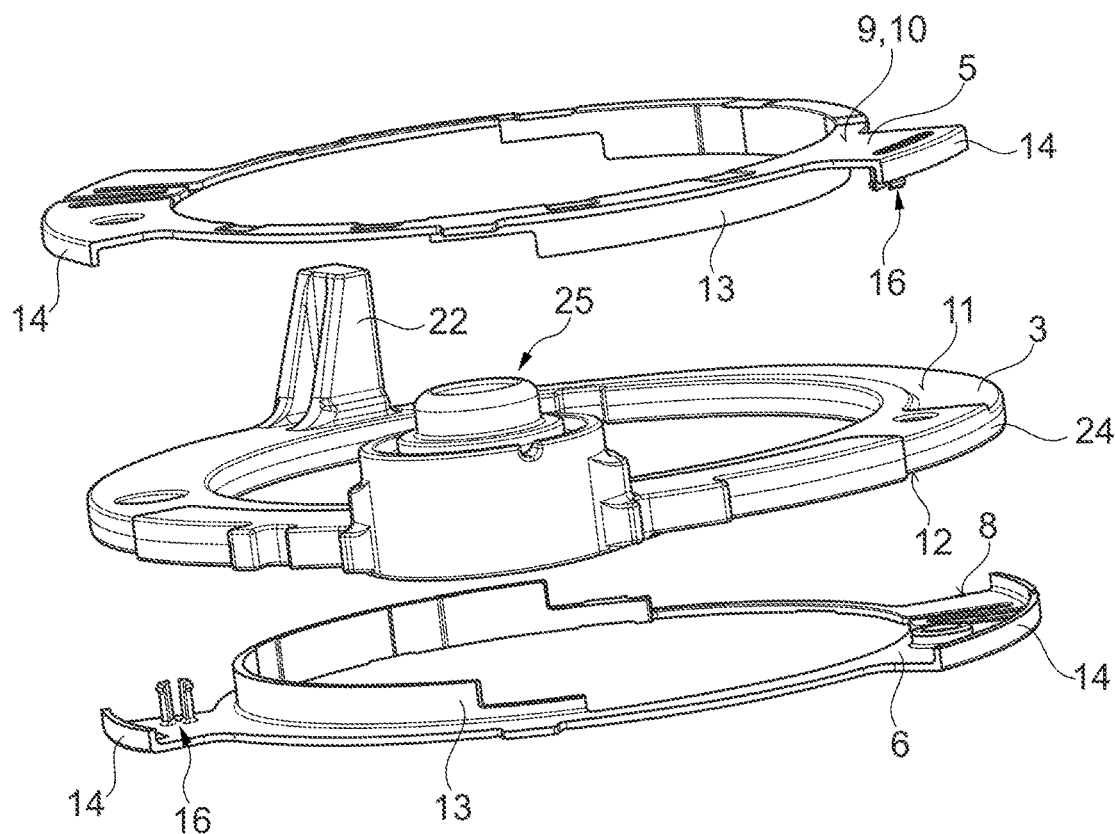
Figure 14:
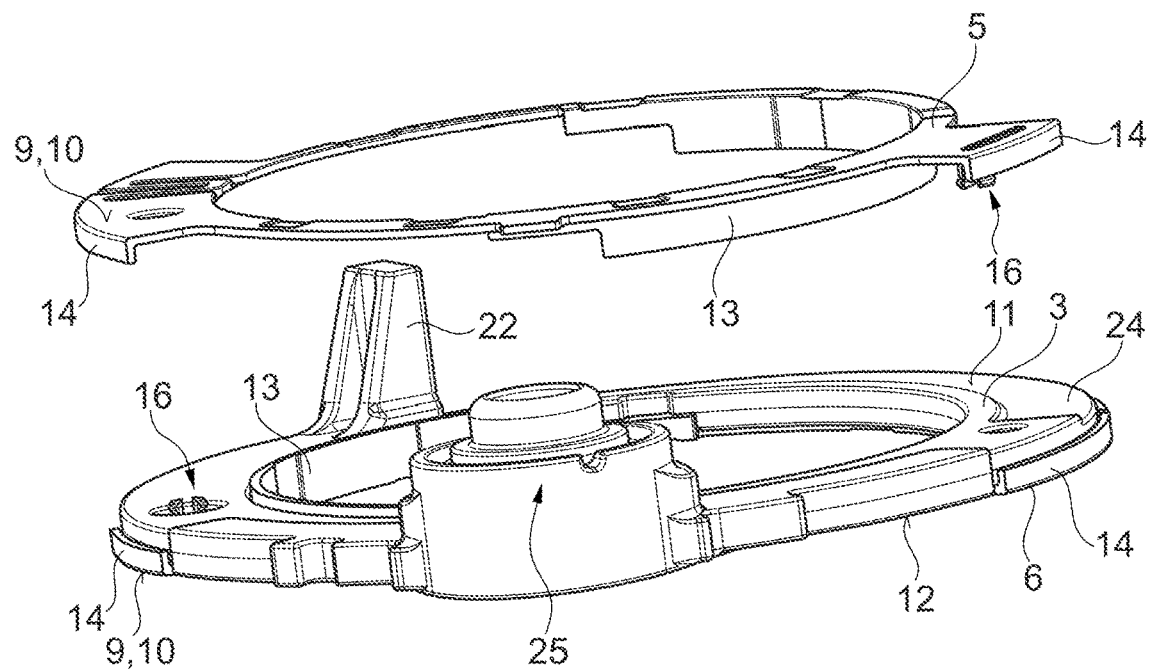

The further design of the tensioning arm 3 can also be seen in FIGS. 10 and 11. Here, the tensioning arm 3 has an annular base body 24. In one peripheral area of this base body 24, the lever 22 is arranged. In a peripheral area of the base body 24 offset relative to the lever 22, a tensioning roller mount 25 is attached for the rotating support of a tensioning roller 4 that can be easily seen in FIG. 1. This tensioning roller mount 25 has a roller bearing that supports the tensioning roller 4 in the operating state so that it can rotate freely relative to the tensioning arm 3.

The tensioning arm 3 is connected to the base unit 2 during operation such that it extends through the base body 18 in the radially outward direction in the area of the tensioning roller mount 25. Here, a recess 33 that extends in the peripheral direction is formed in the base body 18. The recess 33 extends so far in the peripheral direction that the tensioning arm 3 can rotate during operation of the traction mechanism tensioner 3 relative to the base body 18/base unit 2 without being blocked on the base body 18 in the rotational direction in an angle between 5° and 50° (against the pretensioning of the spring tensioning unit 19).

According to the invention, the two bearing components forming a sliding support for the tensioning arm, namely the first bearing component 5 and the second bearing component 6, as can be easily seen, e.g., in FIGS. 12 to 18, are mounted on the tensioning arm 3 in the operating state. The two bearing components 5 and 6 are constructed as identical parts, which is why the construction of the first bearing component 5 according to FIG. 17 also relates to the second bearing component 6. The first bearing component 5 is constructed, in turn, essentially with a ring shape. The first bearing component 5 here has a disk-shaped base section, subsequently designated as first base section 7a. Through the first base section 7a and the second base section 7b, each bearing component 5, 6 forms an axial first end side 8 that contacts the tensioning arm 3 in a rotationally locked manner during operation and an axial second end side 9 that is used as a sliding bearing surface 10 for the sliding/rotating support relative to the base body 18 or the cover 20. The first base section 7a contacts a first axial side 11 of the tensioning arm 3, with this first side 11 facing away from the cover 20 during operation; the second base section 7b contacts a second axial side 12 of the tensioning arm 3, with this second side 12 facing the cover 20 during operation.

Figure 7:
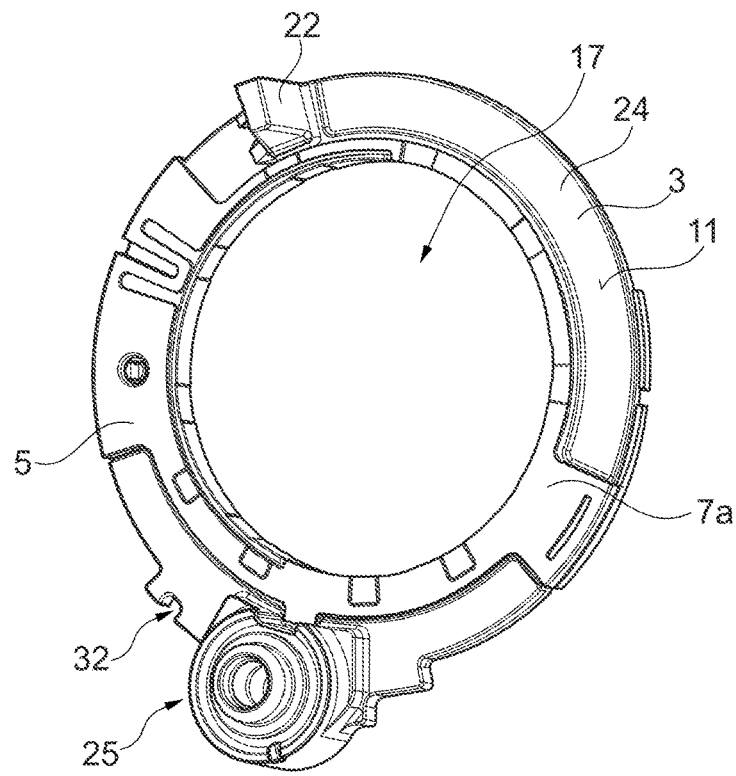
Figure 8:
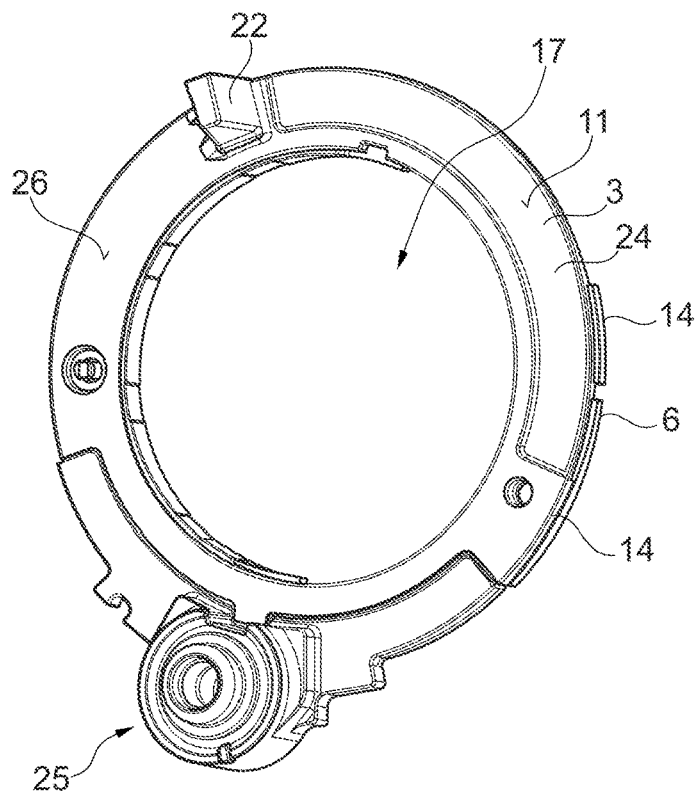
Figure 9:
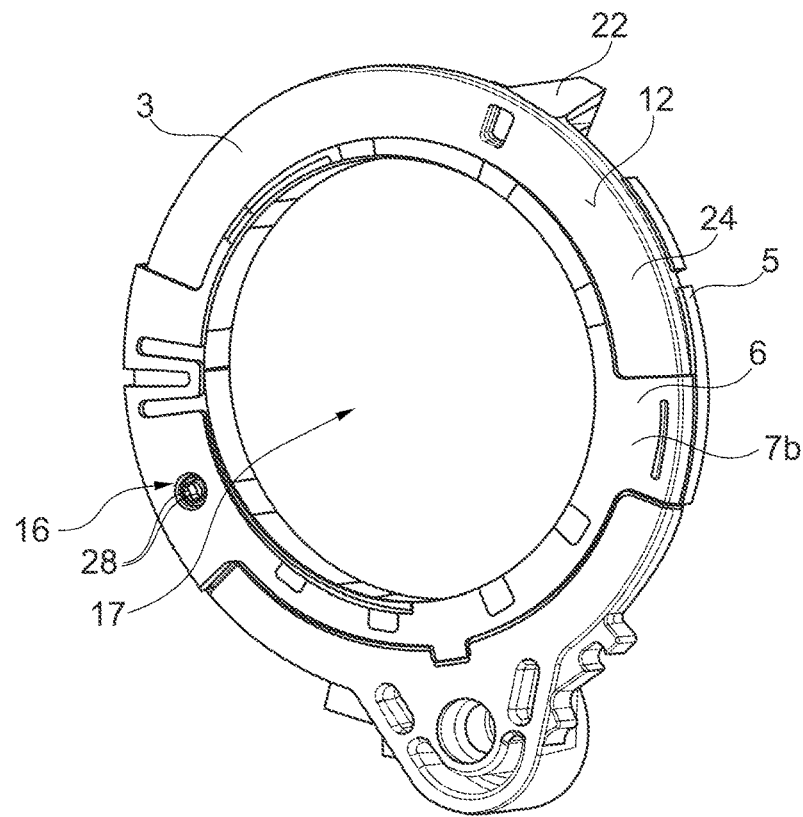

A first end side 8 of the first base section 7a is the axial end side of the first bearing component 5 that is allocated to and contacts the tensioning arm 3 during operation. This can be seen especially well in FIG. 7 in which the first bearing component 5 is already mounted on the tensioning arm 3 in a rotationally locked manner. The first end side 8 has a surface structure/friction lining increasing the friction force, so that the rotationally locked connection with the tensioning arm 3 is formed by a friction-locking contact of the first bearing component 5 on the tensioning arm 3. The first bearing component 5 is in a first receptacle recess 26 of the tensioning arm 3 with a complementary construction relative to the contour of the first end side 8/first base section 7a.

An inner collar area 13 along a certain peripheral area of the base section 7a, here essentially 180°, is bonded integrally on a radial inner side of the first base section 7a. This inner collar area 13 extends in a partial ring shape on a radial inner side of the first base section 7a and also in the axial direction away from the first base section 7a. With this inner collar area 13, the first bearing component 5 contacts a radial inner side of the tensioning arm 3 in the mounted state, so that the tensioning arm 3 is supported on the inside in the radial direction relative to the first bearing component 5. In this construction, the inner collar area 13 simultaneously forms on its radial side facing the tensioning arm 3 (its radial outer side), a friction lining/surface structure increasing the friction force, wherein the tensioning arm 3 is connected to the respective bearing components 5 and 6 in a rotationally locked manner with a friction-fit connection.

In addition, on the first base section 7a, two reinforcement areas arranged offset relative to each other along the periphery are formed, which are thicker/extend in the radial direction toward the outside. A first reinforcement area 27a has a means for connecting to the tensioning arm 3 and also to the second bearing component 6. The first bearing component 5 has this first reinforcement area 27a used as a connecting area on a first peripheral location of the base section 7a. The first reinforcement area 27a has a latch tab connection 16. This latch tab connection 16 has, in turn, two elongated, axially extending latch tabs 28. In this way it is possible to connect both the tensioning arm 3 and also the second bearing component 6 in a positive-fit and non-positive-fit connection to the first bearing component 5.

The second bearing component 6 also has, due to its identical design to the first bearing component 5, such a latch tab connection 16. The second bearing component 6 is arranged, in turn, on a second side of the tensioning arm 3 facing away from the base section 7a of the first bearing component 5 and in a second receptacle recess 31 with a friction-fit connection.

Figure 15:
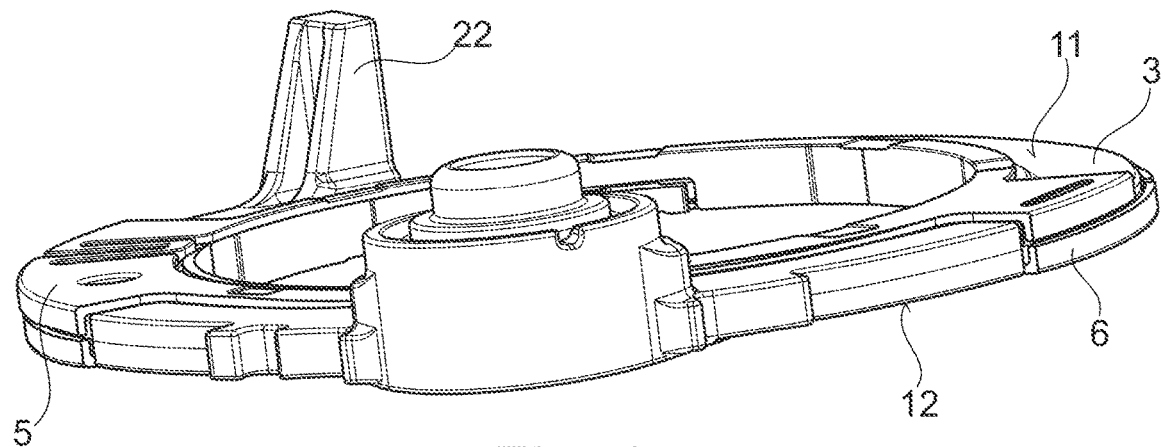
Figure 16:
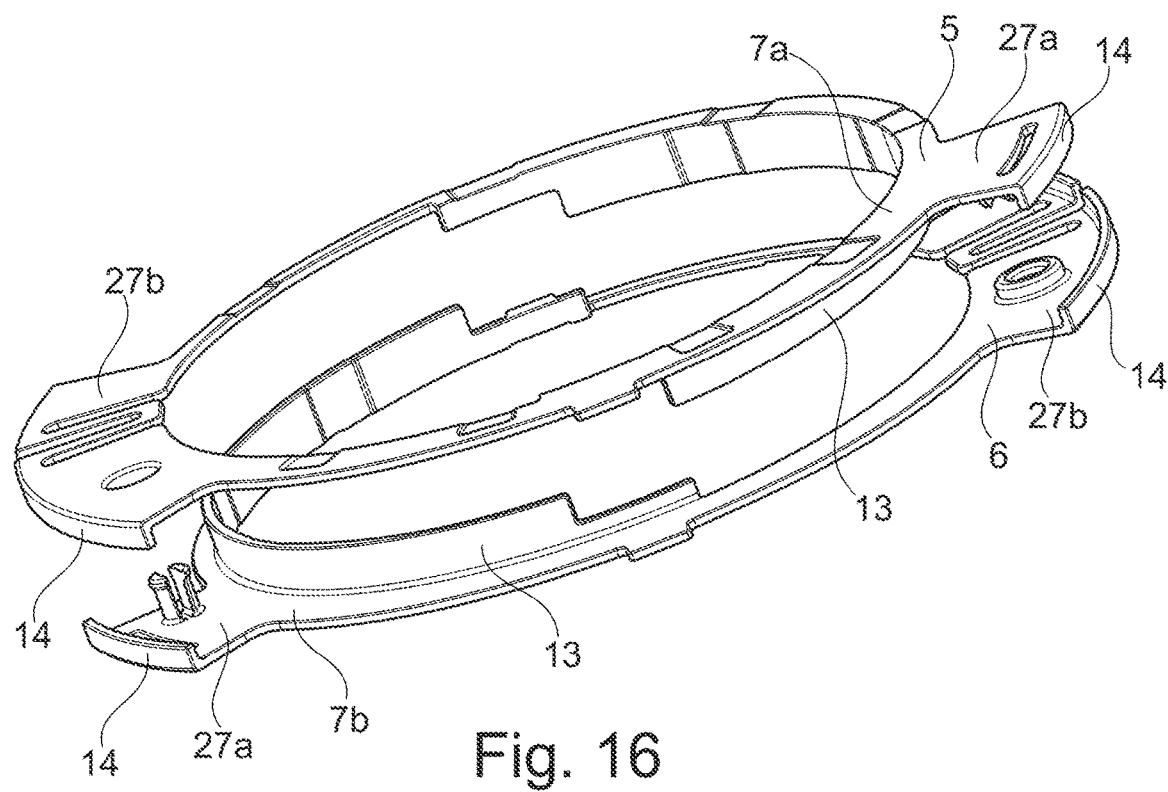
Figure 18:
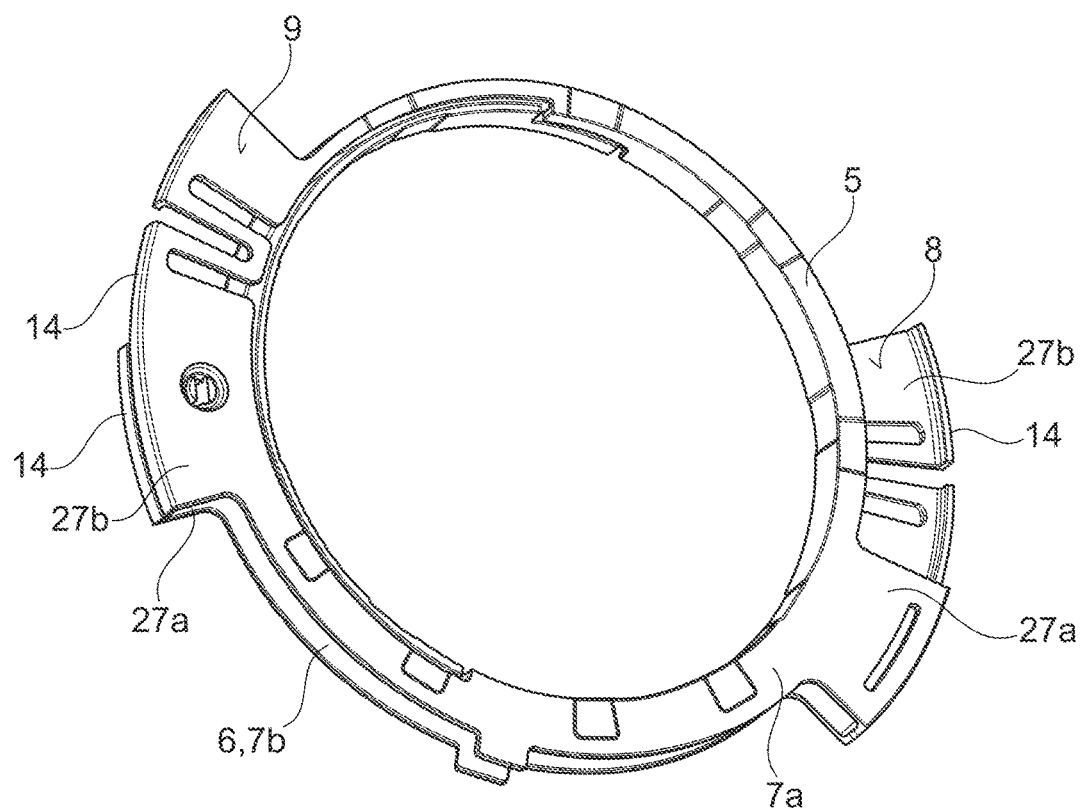

For the positive-fit locking of the latch tab 28 of the respective bearing components 5, 6 to each other, the respective bearing component 5, 6 has a second reinforcement area 27b that is arranged in the peripheral direction offset relative to the first reinforcement area 27a of the same bearing component 5, 6 and forms a connection mount in the form of a receptacle hole 29 (FIGS. 16 and 18). This receptacle hole 29 is used for the positive-fit and non-positive-fit holding of the latch tab connection 28/the latch tab 28 of the other bearing component 5, 6. As can be seen especially well in connection with FIGS. 12 to 15, the respective latch tab 28 is guided through a through hole 30 in the tensioning arm 3, so that it is connected on the side opposite the tensioning arm 3 to the other bearing component 5, namely the receptacle hole 29. In this way, an especially effective and rigid connection of the bearing components 5, 6 is realized, which can also be produced in an especially simple way by the plastic construction of the bearing components 5, 6.

In addition to the inner collar area 13, the bearing components 5, 6 each have outer collar areas 14 that extend along a peripheral part area on the base section 7a, 7b in the peripheral direction. The first base section 7a has, representative for the second base section 7b in the area of its reinforcement area 27a, the outer collar area 14 that extends away from the first base section 7a in the same axial direction as the inner collar area 13. The outer collar area 14 extends relative to the tensioning arm 3 such that it supports this arm radially on the outside during operation.

It should also be noted that the two bearing components 5, 6 (FIG. 10) are indeed constructed as identical parts, but are arranged rotated relative to each other by approximately 180° along the periphery of the base unit 2/tensioning arm 3/traction mechanism tensioner 1. Therefore, the respective first reinforcement areas 27a and second reinforcement areas 27b of the bearing components 5, 6 are rotated relative to each other by 180°.

In one transport position of the traction mechanism tensioner 1, as can also be seen easily in FIGS. 1 to 4, positive-fit locking passages 32 in the form of through holes in the base body 18 and the cover 20 and in the form of an outer side recess in the tensioning arm 3 are used for holding a locking tool 15 in the form of a locking pin. The locking tool 15 projects into these locking passages 32 under rotationally locked support of the tensioning arm 3 relative to the base unit 2 and is removed from these locking passages 32 when the traction mechanism tensioner 1 is in operation.

Figure 17:
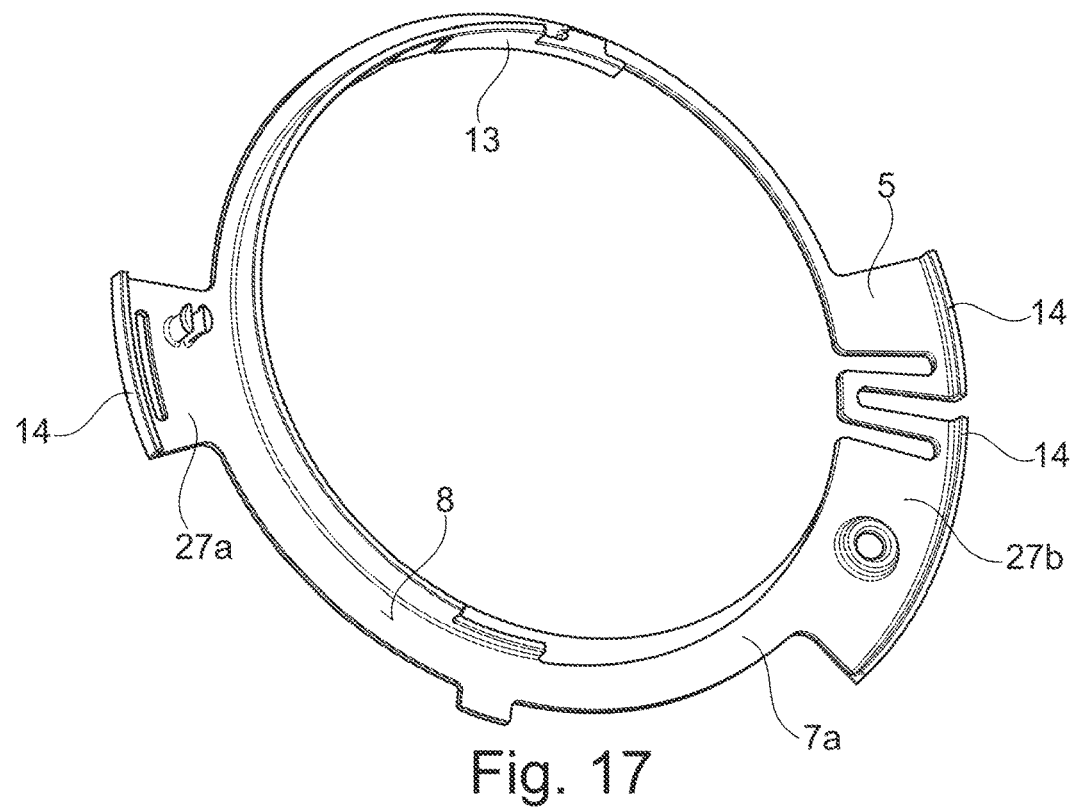

In other words, a traction mechanism tensioner 1 with an annular lever assembly is realized. This annular lever assembly has multiple parts, preferably three parts (tensioning arm 3 and at least two bearing components 5, 6) and is formed of an aluminum ring lever (tensioning arm 3 made from aluminum material) and two identical plastic sliding bearings (bearing components 5, 6) as shown in FIGS. 16-18 and others. Through the two-part construction, the following advantages are produced: The sliding lining (bearing component 5, 6; FIG. 17) can be adopted as a carry-over part in all application-specific constructions (modular design principle). In this way, the wide range of variants, the storage, etc., are reduced. Also, the tool costs are reduced. The operating range of the tensioning system is typically between 5° and 50°. In this way, a rotating annular lever assembly (FIG. 7) is constructed in an especially smart manner, wherein the lever lengths (axial extent) of the lever 22 is preferably measured between 60 mm and 75 mm. A free inner diameter (diameter of the passage hole 17 of the tensioning system 1 is further preferred at least 70 mm for guaranteeing the cooling air flow for the generator/the housing of the generator. A system damping is generated in contact between the combination radial-axial sliding bearing. The sliding bearing linings 5, 6 (FIGS. 13-14) are clipped onto the rotating annular lever 3 (FIG. 15). The radial friction lining (FIG. 17) extends over half the periphery (180°) of the rotating annular lever (FIG. 15), the separating point (FIG. 16) is always located outside the loaded zone.

LIST OF REFERENCE SYMBOLS

1 Traction mechanism tensioner
2 Base unit
3 Tensioning arm
4 Tensioning roller
5 First bearing component
6 Second bearing component
7a First base section
7b Second base section
8 First end side
9 Second end side
10 Sliding bearing surface
11 First side
12 Second side
13 Inner collar area
14 Outer collar area
15 Locking tool
16 Latch tab connection
17 Passage hole
18 Base body
19 Spring tensioning unit
20 Cover
21 Receptacle
22 Level/spring driver
23 Spiral compression spring
24 Base body
25 Tensioning roller mount
26 First receptacle recess
27a First thick area
27b Second thick area
28 Latch tab
29 Receptacle hole
30 Passage hole
31 Second receptacle recess
32 Locking passage
33 Recess

The invention claimed is:

1. A traction mechanism tensioner for a traction mechanism drive of an internal combustion engine, the traction mechanism tensioner comprising a base unit, a ring-shaped tensioning arm supported to be rotatable about a rotational axis relative to the base unit, a tensioning roller provided for pretensioning a section of an endless traction mechanism arranged on the tensioning arm, and two bearing components that abut each other and are connected directly to each other, and by which the tensioning arm is supported for rotation on the base unit, and the bearing components are constructed as identical parts.

2. The traction mechanism tensioner according to claim 1, wherein each said bearing component has a disk-shaped base section.

3. The traction mechanism tensioner according to claim 2, wherein the base section contacts the tensioning arm with an axial end side facing the tensioning arm.

4. The traction mechanism tensioner according to claim 3, wherein the base section is constructed with an axial end side facing away from the tensioning arm as a sliding bearing surface that is held on or in the base unit to be rotatable relative to the base unit.

5. The traction mechanism tensioner according to claim 2, wherein a first one of the bearing components is arranged with the base section thereof on a first axial side of the tensioning arm and a second one of the bearing components is arranged with the base section thereof on a second axial side of the tensioning arm.

6. The traction mechanism tensioner according to claim 1, wherein each said bearing component forms an inner collar area that runs in an axial direction and supports the tensioning arm in a radial direction on inside thereof.

7. The traction mechanism tensioner according to claim 1, wherein each said bearing component forms at least one outer collar area that runs in an axial direction and supports the tensioning arm in a radial direction on the outside.

8. The traction mechanism tensioner according to claim 1, wherein the two bearing components are connected to at least one of each other or to the tensioning arm by at least one of a positive-fit or a non-positive-fit connection.

9. A traction mechanism tensioner for a traction mechanism drive of an internal combustion engine, the traction mechanism tensioner comprising a base unit, a ring-shaped tensioning arm supported to be rotatable about a rotational axis relative to the base unit, a tensioning roller provided for pretensioning a section of an endless traction mechanism arranged on the tensioning arm, and two bearing components connected to each other and by which the tensioning arm is supported for rotation on the base unit, and the bearing components are constructed as identical parts, wherein the two bearing components are connected to each other by at least one latch tab connection with a rotationally locked holding of the tensioning arm.

10. A traction mechanism tensioner for a traction mechanism drive of an internal combustion engine, the traction mechanism tensioner comprising a base unit, a ring-shaped tensioning arm supported to be rotatable about a rotational axis relative to the base unit, a tensioning roller provided for pretensioning a section of an endless traction mechanism arranged on the tensioning arm, and two bearing components connected to each other and by which the tensioning arm is supported for rotation on the base unit, and the bearing components are constructed as identical parts, wherein the bearing components are arranged rotated relative to each other along a periphery with respect to a rotational axis of the tensioning arm.

* * * * *